United States Patent Office 3,288,418
Patented Nov. 29, 1966

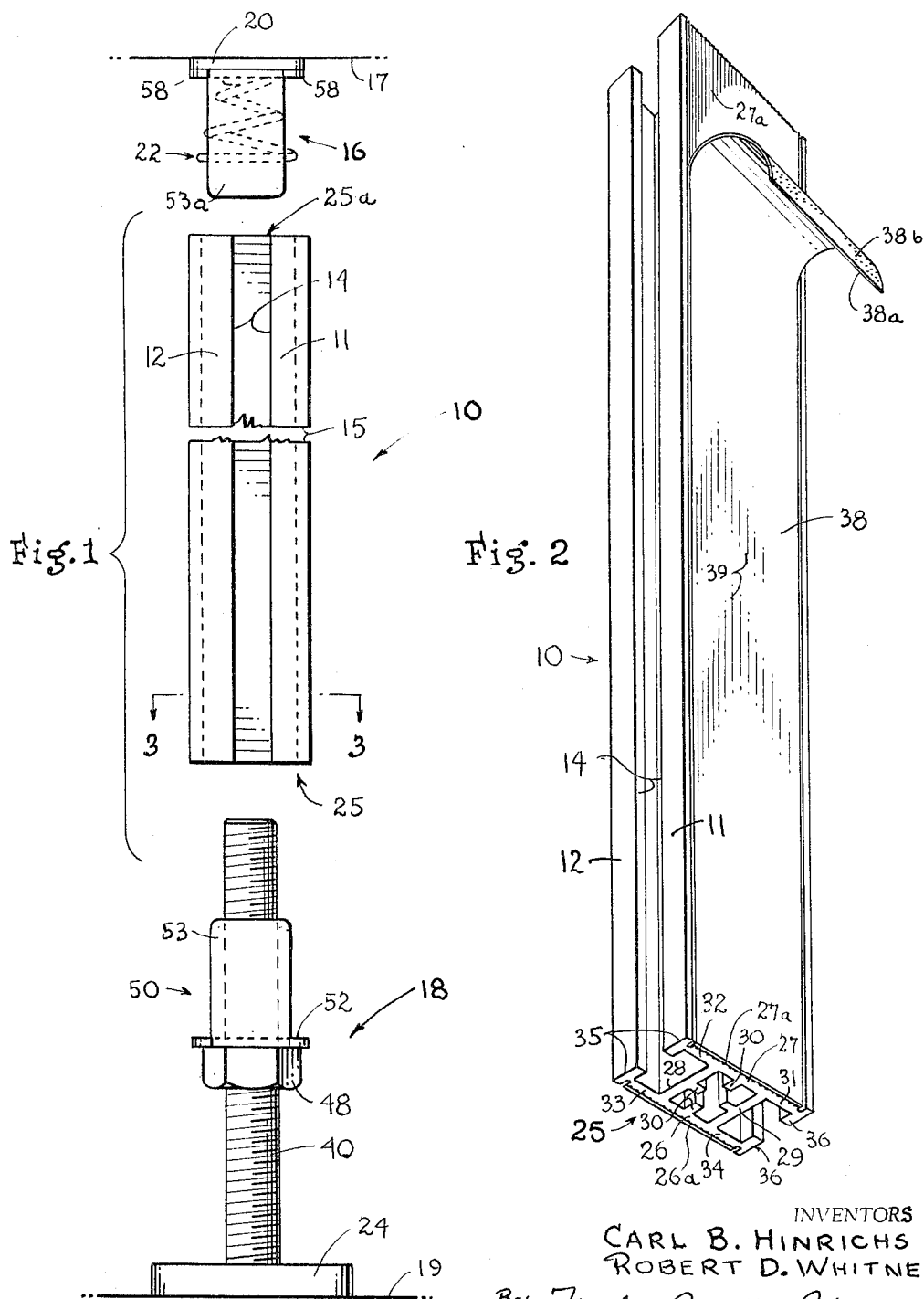

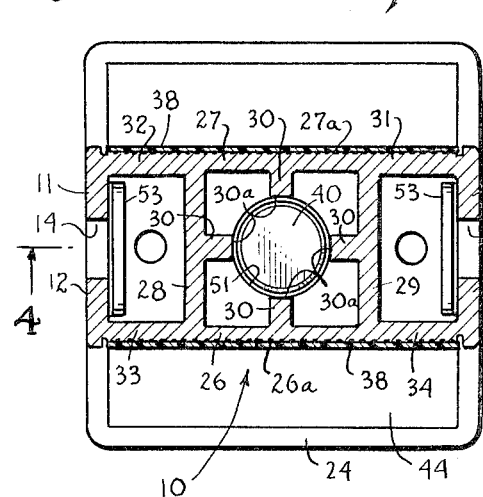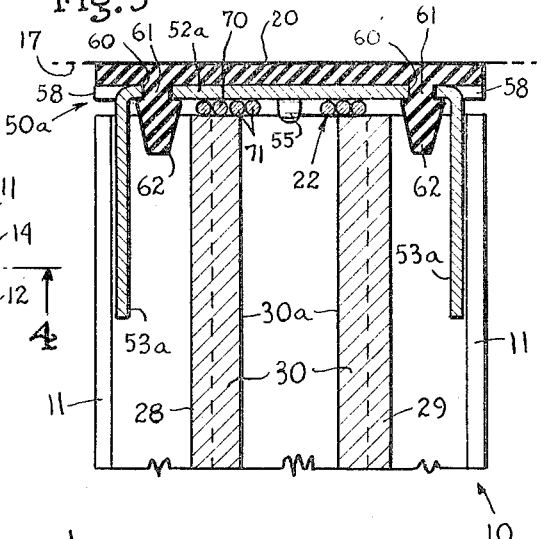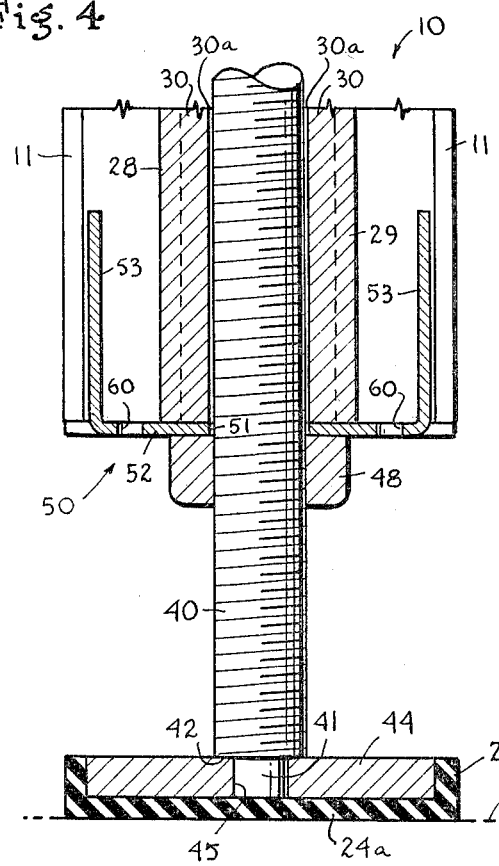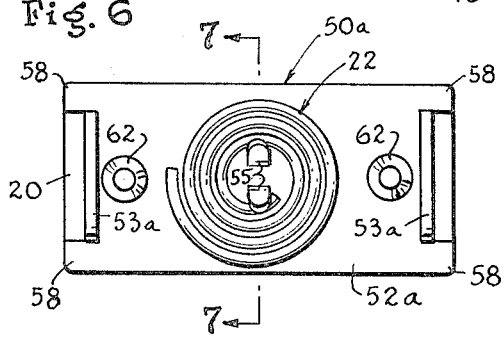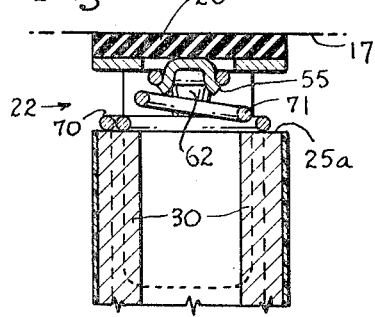

3,288,418
STRUCTURAL POLE ASSEMBLY
Carl B. Hinrichs, Charlotte, and Robert D. Whitney, Lansing, Mich., assignors to Structural Products, Inc., Charlotte, Mich., a corporation of Michigan
Filed Dec. 6, 1963, Ser. No. 328,610
10 Claims. (Cl. 248—354)

The present invention relates to improved structural pole assembly, and more particularly to a new decorative pole fabricated from a thin walled extrusion having at least one flat, normally exposed in use, face for mouting decorative vinyl, or the like. The pole assembly includes improved apparatus cooperable with pole end surfaces and structural securement surfaces to provide predetermined stressing for the pole and/or the securement surfaces.

The present pole assembly is characterized mechanically by structure for axially aligning stresses substantially with the longitudinal axis of a web reinforced box-beam, which beam further provides part of an exterior flat elongated surface for mounting decorative vinyl material, or the like. The webs are, accordingly, internal of the box beam and provide further attributes of centrally confining an adjustment screw-stud; and providing incremental spring-constant adjustment for affording accurate stress loading of the pole and/or the securement surfaces.

It is desirable in use of structural poles of the type to be disclosed more fully hereinbelow, as well as broadly related structural poles of the type shown in the co-pending joint aplication of Carl B. Hinrichs and Ronald W. Lane, Serial No. 255,317, now Patent No. 3,228,646, granted January 11, 1966, entitled "Support Structure Assemblies," to stress same sufficiently to provide adequate securement under several variable conditions, such as between slightly yieldable floors and ceilings, as well as between relatively rigid spaced securement surfaces, for example.

A broad utility for the present structural pole assembly resides in the use of same in locations where the ambient temperatures may vary through a broad range. During such variations, structural elements will expand and contract. As is well known, aluminum, of which the present poles are composed preferably as extrusions, has a higher relative coefficient of thermal expansion than common structural elements used in connection therewith. Because the poles are usually long (seven feet and longer being widely used) total expansion and contraction of the pole can be several thousandths of an inch more than associated structural elements. The present pole assembly can be arranged to compensate for stresses such as could be caused by differential expansion.

In addition to the above structural advantages over prior pole assemblies, the pole combined with the decorative side covering is facilitated in a more economical manner than hitherto. This new pole covered on two sides comprises but three parts, two of which vinyl strips may be identical. The prior pole comprises five parts, of which two pairs may be identical. The new pole is strong yet conducive to more economical manufacture, even though the total of strength imparting material (extrusion) may have a greater cross-sectional area, because the number of parts requiring assembly is reduced.

A fastening plate for this pole is stressed, when the pole assembly is installed, to an extent sufficient to properly secure the pole and equipment supported thereby between securement surfaces. This plate also is designed for use without modification with that type of pole disclosed in the above-identified application. It is anticipated that other prior and/or future poles as well may be functionally broadened in utility with this stressed fastening plate. This plate also provides for improved mechanical securement of a rubber-like bolster pad thereupon.

Accordingly, it is a broad object of this invention to provide an improved structural pole assembly.

Another object is to provide an improved stressed fastening plate for a structural pole assembly.

Still another object in keeping with the next preceding object is to provide a fastening plate usable as either a stressed or stressing member with only minor modification.

A further object, in keeping with the preceding objects, is to provide improved apparatus for selectively stressing a structural pole and associated securement surfaces.

A still further object in connection with any of the preceding objects is to provide an improved decorative structural pole assembly.

The foregoing, and other objects and advantages of this invention will be either obvious or pointed out in the following specification and claims read in view of the accompanying drawings, wherein like reference characters indicate similar parts, and in which:

FIG. 1 is an exploded view of the invention;
FIG. 2 is a perspective view of a structural pole;
FIG. 3 is a sectional view taken on line 3—3 of FIG. 1;
FIG. 4 is a sectional view taken on line 4—4 of FIG. 3;
FIG. 5 is a tranverse sectional view of the top assembly;
FIG. 6 is a bottom view of the fastening plate; and
FIG. 7 is a sectional view taken as on line 7—7 of FIG. 6, but showing in addition thereto a portion of the top of the pole.

Referring now in detail to the drawings and first to FIG. 1, an elongated extrusion is in the form of a pole 10 having on opposite sides thereof a pair of flanges 11 and 12 which have surfaces thereof substantially in a common plane that define at their edges a groove 14 into which suitable clamping devices, not shown, can be inserted for clamping apparatus such as cabinets and shelves or the like for securement by the pole 10. The pole 10 is shown broken at points 15 so as to move the ends thereof away from a top fastening plate 16 shown in engagement with a ceiling 17, or the like, and the bottom end thereof away from a pedestal sub-assembly 18 shown in contact with a floor 19, or the like.

The top fastening plate assembly 16 secures a rubber pad 20 by mechanical means, to be described in detail below. The rubber pad 20 is preferably of approximately 60 durometer rubber and is urged into engagement with the ceiling surface 17 with a predetermined tension either determined by the compresssion of a conical spring 22 or to a greater extent by the complete compression of the spring in a manner to be described hereinbelow.

The pedestal assembly 18 has a rubber 24 covered base for engaging a floor surface 19. The base of the pedestal 18 is shown as of greater surface area than the rubber bolster pad 20 but it is to be understood that either one or the other can be made larger than the other. It is further to be understood that the pedestal structure 18 may, in certain installations, be preferably placed in engagement with the ceiling and that the fastening plate assembly 16 may preferably be in engagement with the floor. It is also within the spirit of this invention that the poles be arranged horizontally in certain applications where such arrangement of same may serve the ends of utility or provide decorative effects.

Referring now to FIG. 2, a section of the pole 10 is shown in perspective. A bottom end 25 of the pole 10 is formed as a central box-beam having external sides 26 and 27 and internal sides 28 and 29. Each of these sides 26, 27, 28 and 29 is T-shaped in cross-section having an inwardly extending longitudinal web 30 that serves to provide a certain amount of reinforcement to the box-beam and also provides for alignment of the pedestal 18 and for abutment by the spring 22 in a manner to be explained more in detail below.

The sides 26 and 27 of the box-beam at their external faces lie in a plane containing legs of inwardly angled corners 31, 32, 33 and 34, the outer surfaces of which lie in a plane common to the external surfaces of the sides 26 and 27 of the box-beam. The other legs of the angles 31, 32, 33 and 34 are arranged to face each other in pairs 35, 35 and 36, 36 respectively to terminate in flanges 11 and 12 lying in a common plane and providing a groove 14 on each side of the extrusion. A plastic strip 38 is cemented as by cement 38b shown on the back of the strip to the broader sides of the extrusion 10, which strip may be decorated as by wood graining 39 for decorative purposes. Of course, many sorts of surface texture or finish are feasible within the scope of this assembly. However, it is significant to note that if both decorative strips 38 are the same that the entire assembly comprises only three parts, two of which are identical whereby the cost incurred in fabricating parts and assembling same is kept at a minimum.

The pole 10 is fabricated substantially in accordance with conventional extrusion processes and is what is considered a thin-wall extrusion. To fabricate the pole, the extrusion process is carried out at a temperature of approximately 1,000 degrees F., and a billet of aluminum is employed to provide an elongate therefrom. The extrusions in this particular application, wherein straightness and trueness are additional attributes, is stretched after being cooled and thereafter cut off to suitable lengths and heat treated for 24 hours at approximately 250 to 300 degrees F. The extrusions thereafter are anodized and the plastic is put on thereafter.

In the extrusion process, the surfaces 26a and 27a are intentionally fluted with very closely spaced shallow grooves as indicated at the top of FIG. 7 wherein the end 38a of the strip 38 is shown peeled away to present additional surface area for the cement 38b which secures the vinyl strip 38. The surfaces 11 and 12 are preferably drawn through buffed die surfaces, or are buffed after extrusion in order to provide a glossy finish. Of course the extrusion may be dyed to simulate silver or other colors in well known manner. It is of significance, however, that all but a very small percentage of extrusions in trade channels of the character of the present invention are provided with decorative coatings such as a vinyl strip 38.

Referring now to details of construction shown in FIGS. 3 to 7, and first to FIGS. 3 and 4, pole 10 is shown in co-operative relationship with the pedestal 18. The pedestal 18 comprises a screw 40 which may be conventional rolled steel screw stock of predetermined length of approximately six inches, for example. The screw 40 has a turned down end 41 providing an abutment shoulder 42 for engaging a steel plate 44. A central hole 45 in the plate 44 is slightly undersized with respect to the end 41 so that the same may be conveniently press-fitted to afford economical fabrication. While not to be construed in a limiting sense, it has been found that a suitable low carbon steel that is capable of readily taking an inexpensive chrome plate is preferred, and quarter inch plate serves well for this purpose. The rubber coating 24 has a bottom pad 24a which engages the surface 19, FIG. 1. It is preferred that this be a white rubber base of approximately 60 durometer and is bonded to the surfaces of the plate 44 substantially as shown in FIG. 4. After bonding the entire sub-assembly including the screw 40, the plate 44 and the rubber coating 24 are subjected to the chrome plating process, and it is found that this rubber does not contaminate the chrome plating solution while the metal parts are being plated.

An adjustment nut 48 is threaded upon the screw 40 and abuts a bracket 50 that is fabricated in the same die as the fastening plate 16, FIG. 1, but having a hole 51 in the center thereof rather than spring-retaining fingers, to be described hereinbelow in connection with FIGS. 5, 6 and 7. The bracket 50 comprises a bottom plate 52 and oppositely arranged vertical legs 53 which are identical to each other. The legs 53 have external surfaces spaced to freely move within the angle legs 11 and 12 of the extrusion 10 on opposite sides thereof, which legs orient the bracket 50 with respect to the bottom 25 of the extrusion 10. Accordingly, the center hole 50 in the base 52 will lie substantially in alignment with internal surfaces 30a of the webs 30 in the extrusion 10. The screw 40 has an external diameter a few thousandths of an inch less than the spacing between opposite surfaces 30a of webs 30 and accordingly may be guided thereby to the extent the top of the screw 40 extends between the surfaces 30a. Such assembly will contribute to lateral securement of the post 10 with respect to a desired position on a floor or ceiling or other surface.

With reference again to FIG. 1, from the position shown, for ues the extrusion 10 will have its bottom surface 25 moved down into engagement with the top surface of the bottom 52 of the bracket 50. The fastening plate 16 is likewise engaged by top surface 25a of the extrusion 10 so that the spring 22 engages the end surface 25a. The nut 48 on the screw 40 is turned downwardly from the position shown in FIGS. 1 and 4. The pad 20 is then suitably located in position on a ceiling 17, for example. Suitable hand force can be used to compress the spring 22 while the lower pad 24 is properly located on a point on the floor 19. Thereafter the nut 48 is rotated to drive the bracket 52 and the extrusion 10 upwardly to compress the spring 22 to a predetermined degree to complete the placement of a pole 10.

Referring now to FIGS. 5, 6 and 7, the details of the fastening plate 16 are shown. The bracket 50a for same, now to be described, is substantially identical to the bracket 50 described in connection with FIG. 4 and like parts bear similar reference numerals with the suffix a. The upper bracket 50a differs from the bracket 50 in not having a central hole 51 but instead having at least two pressed-in ears 55 struck out of a horizontal plate 52a at the center thereof for securing a frusto-conical flat ended compression spring 22 at the small end of the frustum. The legs 53a depend within the shoulders 11 and 12 (legs 11 only being shown) of the extrusion 10 and are oriented thereby to centrally locate the spring 22 substantially in alignment with the central longitudinal axis of the extrusion 10. The horizontal plate 52a has extended ears 58 at its corners to support the corners of the rubber pad 20.

The plate 52a has holes 60 at points equally spaced from the center of the plate 52a in which necks 61 fit snugly. Spade connectors 62 are molded integrally with the rubber pad 20 and the necks 61. Assembly is convenietly facilitated by pulling the spade connectors 62 wetted with water through the holes 60. It is found that such mechanical connection can withstand substantial expansion and contraction of parts without working loose. Loosening of pads has been found to be a shortcoming of commercially available cements when placed in the same stressed conditions, and this accordingly is another attribute of the invention.

The spring 22 in FIG. 5 is shown subjected to maximum compression and accordingly the force exerted between the extrusion 10 and the pad 20 can be applied to an extent greater than the force available with the spring left in an active condition such as indicated in FIG. 7 and to be described more fully below. Such maximum compression may be desirable in certain installations where there are flexible floors or ceilings because the maximum spring travel can be attained. In other uses, it may be desirable to stress the extruded post 10 to a higher degree than possible through use of spring stress alone for the purpose of adding support to an upper floor, for example. It has been found, even though the spring may be used beyond maximum compression that the use of a spring having substantial travel and a relatively high spring constant is conducive to more facile assembly; and in addition provides for compensation of surface irregularities which may vary within tolerable limits of spring expansion.

In the particular specific example set forth above, the free length of the spring 22 may be approximately one-half of an inch, for example. The portion of the conical spring utilized is substantially frusto-conical and has square or flat ends. The smaller of these flat ends is secured between the ears 55 which can be conveniently left straight in the stamping operation and swedged by suitable tools in the position shown in FIG. 7 during assembly. This comprises a convenient assembly and permits boxing a number of the fastening plates in a sub-assembly substantially the same as shown in FIG. 6 which sub-assembly includes the spring 22, fastening plate 58 and the rubber pad 20. It is appreciated that different spring constant springs will be desired for different uses of the structural pole assembly and it is convenient simply by changing the wire gauge of the spring 22 to accomplish such purpose.

Referring now to FIG. 7, a bolster pad 20 is shown in engagement with the ceiling surface 17 and the spring 22 is shown as partially compressed with relationship to the showing of same in FIG. 1.

When it is desired to compensate for either thermal expansion or relative movement of a ceiling 17 with respect to a floor, or with respect to the extrusion 10 as when same is used in long lengths, or when it is desirable to compensate for surface irregularities between floors and ceilings, the springs 22 may be modified but are preferably conical for different reasons. The conical spring 22 of the type herein shown is adapted to have the several convolutions set down upon a support surface consecutively and a spring constant of same will be increased [the spring becomes stiffer] as more points of contact of the spring engage the upper surface 25a of the extrusion 10. Accordingly, the webs 30, of which there are four in this disclosure, will establish four points of change for at least the two outer convolutions 70 of the spring 22.

As best shown in FIG. 5, all of the larger diameter convolutions 70 are shown in engagement with the upper surface 25a of the webs 30. As shown in FIG. 7, the outer convolutions 70 have less engagement than shown in FIG. 5 and accordingly the spring 22 is at a lower spring constant than the spring in FIG. 5. As succeeding convolutions 71 engage the top surfaces of the webs 30 there will be still higher effective spring constants and accordingly there will be a greater force exterted between the top surface of the extrusion 10 and the ceiling 17.

According to the above, the structural pole assembly can be positioned to provide a few thousandths of an inch of expansion and contraction of the pole 10 while still not bringing parts to a point of contact such as shown in FIG. 5 wherein stresses may exceed desirable limits to injure ceiling surfaces or to cause deformation of the extruded pole 10 when the abutting surfaces are rigid. Accordingly, further the rubber thickness of both the base pad 24a in FIG. 4 and the ceiling pad 20 can be considerably thinner than heretofore used and the spring will asure substantially a uniform force through small expansions and contractions.

In keeping with this invention, it is possible to utilize longer springs than shown and described to provide still a greater distance of travel or for accommodating for different surface irregularities while still attaining a firmly secured structure. It is possible in this type of spring to attain forces on the order of 100 to 300 pounds of total stress, for example, without stressing parts excessively. If such stress is excessive on ceiling parts, for example, it is within the spirit of the invention to provide an enlarged pad 20 backed by a suitable metal plate such as the plate 44 disclosed in the pedestal, for example. Another alternate assembly is to use the pedestal 28 with its adjustment screw 40 adjacent the ceiling, and use the securement plate 16 in engagement with the floor.

While we have shown a presently preferred embodiment of the invention, obviously modifications will occur to others skilled in the art. Accordingly, we desire not to be limited in our invention only to the specific form shown and described, but by the scope of the following claims.

We claim:

1. A thin-walled extruded pole having at least two substantially flat exterior faces for supporting decorative material, comprising an elongated box beam having four T-shaped sides with legs of the T-shaped sides extending inwardly, angle portions of the pole formed with outer faces of pairs of portions lying in a plane extending at each side from the plane of an exterior side of said box beam for forming the material supporting faces, said angle portions having inwardly facing legs at an angle to said extending plane for forming internal shoulders, and decorative material secured to said faces.

2. A pole as set forth in claim 1 wherein said material supporting faces include longitudinal grooves, and the securing material is cement adapted to enter the grooves.

3. An adjustable pole assembly including a thin-walled extruded pole having at least two substantially flat exterior faces for supporting decorative material, said pole comprising an elongated box beam having four T-shaped sides with legs of the T-shaped sides extending inwardly, and angle portions of the pole formed with outer faces of each portion lying in a plane extending from the plane of an exterior side of said box beam for forming the material supporting faces, said angle portions having other legs at an angle to said extending plane for forming internal shoulders, decorative material supported on said faces, and a support bracket for said pole, said bracket comprising a surface for engaging the pole, a pair of spaced apart tongues extending at an angle to said surface and being arranged to enter an opening provided by the internal shoulders of the pole and to be positionally oriented thereby, and an adjustable means connected to the support bracket for adjusting the pole relative to a supporting surface.

4. An assembly as set forth in claim 3, and a fastening plate for said pole, said plate comprising a surface for applying stress to the end of the pole, a pair of spaced apart tongues extending at an angle to said surface, said tongues being arranged to enter the shouldered end of the pole between said angle portions within said inwardly facing legs and be positionally oriented thereby, a spring for stressing said pole, and means substantially at the center of said plate for securing said spring thereto.

5. A fastening plate for a pole having at least one inwardly shouldered end, said plate comprising a surface for applying stress to the end of the pole, a pair of spaced apart tongues extending at an angle to said surface, said tongues being arranged to enter the shouldered end of the pole and be positionally oriented thereby, a spring for stressing said pole, and means substantially at the center of said plate for securing said spring thereto.

6. A fastening plate as set forth in claim 5, said spring being a wound wire frusto-conical compression spring.

7. A fastening plate as set forth in claim 6, said spring comprising successive coils having outside diameters greater than two cross-sectional dimeters of the wire.

8. A fastening plate as set forth in claim 7, said shouldered end being adapted to receive said coils successively when said spring is compressed to cause the effective spring constant of said spring to increase.

9. A fastening plate for a pole having at least one inwardly shouldered end, said plate comprising a surface for applying stress to the end of the pole, a pair of spaced apart tongues extending at an angle to said surface, said tongues being arranged to enter the shouldered end of the pole and be positionally oriented thereby, means substantially at the center of said plate for engaging a stressing device whereby to fasten the pole, a rubber abutment surface, and mechanical means securing said abutment surface to said plate.

10. A fastening plate as set forth in claim 9, wherein the stressing device comprises a coiled spring, said spring comprising successive coils having outside diameters greater than two cross-sectional diameters of the wire, said shouldered end being adapted to receive said coils successively when said spring is compressed to cause the effective spring constant of said spring to increase.

References Cited by the Examiner

UNITED STATES PATENTS

| | | | |
|---|---|---|---|
| 1,905,124 | 4/1933 | Baum | 52—122 |
| 2,617,501 | 11/1952 | Quelle | 52—720 X |
| 2,843,889 | 7/1958 | Keller | 52—312 |
| 2,903,227 | 9/1959 | Key | 248—356 |
| 2,940,718 | 6/1960 | Beal | 248—245 |
| 2,963,131 | 12/1960 | Brockway | 52—122 |
| 3,161,264 | 12/1964 | Isaacson | 52—301 |

CLAUDE A. LE ROY, *Primary Examiner.*
RICHARD W. COOKE, JR., *Examiner.*